United States Patent
Yamakawa

(10) Patent No.: US 9,384,689 B2
(45) Date of Patent: Jul. 5, 2016

(54) VIEWING ANGLE CHARACTERISTIC IMPROVING METHOD IN LIQUID CRYSTAL DISPLAY DEVICE, AND LIQUID CRYSTAL DISPLAY DEVICE

(71) Applicant: Sharp Kabushiki Kaisha, Osaka-shi, Osaka (JP)

(72) Inventor: Ryo Yamakawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/402,142

(22) PCT Filed: Jul. 23, 2013

(86) PCT No.: PCT/JP2013/069846
§ 371 (c)(1),
(2) Date: Nov. 19, 2014

(87) PCT Pub. No.: WO2014/021132
PCT Pub. Date: Feb. 6, 2014

(65) Prior Publication Data
US 2015/0138260 A1    May 21, 2015

(30) Foreign Application Priority Data

Jul. 30, 2012 (JP) .................................. 2012-168426

(51) Int. Cl.
*G09G 3/36* (2006.01)
*G09G 3/20* (2006.01)
(Continued)

(52) U.S. Cl.
CPC .......... *G09G 3/2003* (2013.01); *G02F 1/13306* (2013.01); *G02F 1/133514* (2013.01); *G09G3/20* (2013.01); *G09G 3/2007* (2013.01); *G09G 3/36* (2013.01); *G09G 2320/0233* (2013.01); *G09G 2320/0276* (2013.01); *G09G 2320/0285* (2013.01)

(58) Field of Classification Search
CPC ... G09G 3/36; G09G 3/3607; G09G 2320/02; G09G 2320/0233; G09G 2320/0271; G09G 2320/028; G09G 2320/0285
USPC ..................................................... 345/87–104
See application file for complete search history.

(56) References Cited

U.S. PATENT DOCUMENTS

2007/0013633 A1* 1/2007 Kamada ................ G02F 1/1362 345/98
2007/0120799 A1* 5/2007 Tanaka ................. G09G 3/3611 345/98

(Continued)

FOREIGN PATENT DOCUMENTS

JP 2011-215479 A 10/2011

*Primary Examiner* — Alexander Eisen
*Assistant Examiner* — Nelson Lam
(74) *Attorney, Agent, or Firm* — Keating & Bennett, LLP

(57) ABSTRACT

An object of the present invention is to improve display quality in oblique view in a liquid crystal display device employing a multi-gap structure. After a gradation-transmittance characteristic when a liquid crystal panel is viewed from an oblique direction is acquired, a range of a gradation value in which a difference between a maximum value and a minimum value among three transmittances corresponding to each of the gradation values is minute is defined as a transmittance approximation range. A white balance parameter stored in a white balance adjustment LUT (130) is determined so that a maximum gradation value after correction by white balance adjustment for each color is set to the gradation value within the transmittance approximation range. By using the white balance parameter determined in this manner, the white balance adjustment is performed during operation of the liquid crystal display device.

3 Claims, 14 Drawing Sheets

(51) Int. Cl.
*G02F 1/133* (2006.01)
*G02F 1/1335* (2006.01)

(56) References Cited

U.S. PATENT DOCUMENTS

| | | | |
|---|---|---|---|
| 2009/0153454 A1* | 6/2009 | Irie | G09G 3/3648 345/89 |
| 2010/0118006 A1* | 5/2010 | Kimura | G09G 3/3611 345/205 |
| 2011/0221786 A1* | 9/2011 | Saitoh | G09G 3/3607 345/690 |
| 2012/0194572 A1* | 8/2012 | Saitoh | G09G 5/06 345/690 |
| 2014/0225943 A1* | 8/2014 | Shiobara | G09G 3/3413 345/694 |
| 2015/0035869 A1* | 2/2015 | Mori | G09G 3/36 345/690 |
| 2015/0138260 A1* | 5/2015 | Yamakawa | G09G 3/20 345/694 |

\* cited by examiner

Fig.9

| INPUT GRADATION VALUE | GRADATION VALUE AFTER CORRECTION | | |
|---|---|---|---|
| | R | G | B |
| 0 | 0 | 0 | 0 | ← 132
| 1 | | | |
| 2 | | | |
| ⋮ | | | |
| 249 | | | |
| 250 | | | |
| 251 | | | |
| 252 | | | |
| 253 | | | |
| 254 | | | |
| 255 | 199 | 195 | 197 | ← 131

INPUT GRADATION VALUE $\begin{cases} R=255 \\ G=255 \\ B=255 \end{cases}$ ⟹ GRADATION VALUE AFTER CORRECTION $\begin{cases} R=199 \\ G=195 \\ B=197 \end{cases}$

Fig.11

INPUT GRADATION VALUE $\begin{cases} R=249 \\ G=254 \\ B=250 \end{cases}$ ⟹ GRADATION VALUE AFTER CORRECTION $\begin{cases} R=194 \\ G=194 \\ B=193 \end{cases}$

| INPUT GRADATION VALUE | GRADATION VALUE AFTER CORRECTION | | |
|---|---|---|---|
| | R | G | B |
| 0 | 0 | 0 | 0 |
| 1 | 1 | 1 | 1 |
| 2 | 2 | 2 | 2 |
| ⋮ | ⋮ | ⋮ | ⋮ |
| 249 | 246 | 206 | 249 |
| 250 | 247 | 207 | 250 | ← 91
| 251 | 247 | 207 | 251 |
| 252 | 248 | 208 | 252 |
| 253 | 248 | 208 | 253 |
| 254 | 249 | 209 | 254 |
| 255 | 250 | 210 | 255 | ← 92

VIEWING ANGLE CHARACTERISTIC IMPROVING METHOD IN LIQUID CRYSTAL DISPLAY DEVICE, AND LIQUID CRYSTAL DISPLAY DEVICE

TECHNICAL FIELD

The present invention relates to a liquid crystal display device, and more particularly to a method for improving a viewing angle characteristic in a liquid crystal display device including a liquid crystal panel having three color filters which are different from one another in thickness.

BACKGROUND ART

Conventionally, there has been known a liquid crystal display device including a liquid crystal panel having three color filters of R (red), G (green), and B (blue) to perform color display. As to the three color filters used in the liquid crystal display device, a gradation-transmittance characteristic is different among the three colors. That is, when attention is given to a certain gradation value, transmittances of light when a voltage corresponding to the relevant gradation value is applied to a liquid crystal layer are different among the three colors. Consequently, in order to make the difference in the transmittance among the three colors small, generally, a structure called a "multi-gap structure" is employed, in which a thickness of the liquid crystal layer differs among the three colors. In the liquid crystal display device employing the multi-gap structure, for example, "R<G<B" holds as to thicknesses of the color filters so that "R>G>B" holds as to the thicknesses of the liquid crystal layer.

In the liquid crystal display device such as a liquid crystal television and the like, a white shade may differ depending on devices due to production variation in color shade of a backlight or the liquid crystal panel. Consequently, in generally, a parameter (a white balance parameter) differing on a device base is used to perform white balance adjustment, whereby the color shade of the liquid crystal display device as a product is kept constant. The white balance adjustment is to adjust a maximum value of an output value to the panel, and the white balance parameter is determined for each color of R, G, and B. At this time, improving balance among R, G, and B offsets the production variation in color shade of the backlight or the liquid crystal panel, and the color shade is kept constant, as described above.

Here, the white balance adjustment will be described. In the white balance adjustment, correction is applied for each of the colors to a value (a gradation value) of gradation data included in an input image signal, so that white is properly displayed regardless of a color temperature of a backlight light source, for example. In order to perform this correction, a lookup table (hereinafter, referred to as a "white balance adjustment LUT") as shown in FIG. 17, for example, is provided. As shown in FIG. 17, in the white balance adjustment LUT, input gradation values and gradation values after correction for the respective R, G, and B (gradation values after white balance adjustment) are associated with one another. For example, a row indicated by reference numeral 91 indicates "the gradation value after correction is set to "247" as to data of R having the input gradation value of "250", the gradation value after correction is set to "207" as to data of G having the input gradation value of "250", and the gradation value after correction is set to "250" as to data of B having the input gradation value of "250". If there exists pixel data in which the input gradation values of R, G, and B are "250", "255", and "251", respectively, the gradation values after correction of the R, G, and B regarding the pixel data are set to "247", "210", and "251", respectively, as shown in FIG. 18. In this manner, the correction of the gradation values is performed based on the white balance parameter determined for each of the colors, whereby white is properly displayed on a screen.

It should be noted that, in connection with the present invention, a technique concerning white balance adjustment in a liquid crystal display device is disclosed in Japanese Patent Application Laid-Open No. 2011-215479. According to the liquid crystal display device disclosed in Japanese Patent Application Laid-Open No. 2011-215479, even before a color temperature of a display image becomes stable, performing proper color temperature adjustment allows an image at a color temperature close to a prescribed color temperature to be displayed in a liquid crystal panel.

PRIOR ART DOCUMENT

Patent Document

[Patent Document 1] Japanese Patent Application Laid-Open No. 2011-215479

SUMMARY OF THE INVENTION

Problems to be Solved by the Invention

However, in the liquid crystal display device employing the multi-gap structure, there is caused a difference in viewing angle characteristic among the three colors due to a difference in thickness of the liquid crystal layer among the three colors. That is, transmittances of light when the liquid crystal panel is viewed from an oblique direction are different among the three colors. Thereby, for example, in the liquid crystal display device employing the structure in which the thickness of the liquid crystal layer of B is smaller than the thicknesses of the liquid crystal layers of R and G, a reddish color tends to be visually observed when oblique view is performed at an angle from almost just beside the liquid crystal panel (refer to FIG. 19). Hereinafter, the above-described phenomenon is referred to as a "colored phenomenon". As described above, in the liquid crystal display device employing the multi-gap structure, display quality is degraded when oblique view is performed. Moreover, the technique disclosed in Japanese Patent Application Laid-Open No. 2011-215479 is a technique for improving the display quality in front view, and cannot be applied to improvement of display quality in oblique view.

Consequently, an object of the present invention is to improve display quality in oblique view in a liquid crystal display device employing a multi-gap structure.

Means for Solving the Problems

A first aspect of the present invention is directed to a viewing angle characteristic improving method in a liquid crystal display device including a liquid crystal panel having three color filters of red, green, and blue which are different from one another in thickness, the viewing angle characteristic improving method comprising:

a characteristic acquisition step of acquiring a gradation-transmittance characteristic indicating a relationship between a gradation value and a transmittance regarding each of the three color filters when the liquid crystal panel is viewed from an oblique direction;

a transmittance approximation range defining step of determining a transmittance approximation range, which is a range of the gradation value in which a difference between a maximum value and a minimum value among three transmittances corresponding to each of the gradation values is minute, based on the gradation-transmittance characteristic;

a parameter determining step of determining a white balance parameter for adjusting white balance of the liquid crystal panel so as to correspond to each of the gradation values for each of red, green, and blue colors; and a white balance adjustment step of correcting the gradation value of each of the colors based on an input image signal supplied to the liquid crystal display device, by using the white balance parameter determined in the parameter decision step, wherein in the parameter determining step, the white balance parameter is determined so that the correction of the gradation value in the white balance adjustment step causes the gradation value within the transmittance approximation range to be a maximum gradation value of each of the colors.

According to a second aspect of the present invention, in the first aspect of the present invention, in the characteristic acquisition step, a plurality of gradation-transmittance characteristics corresponding to oblique views from a plurality of directions are acquired, and when the transmittance approximation range determined based on each of the gradation-transmittance characteristics is defined as a single direction transmittance approximation range, in the transmittance approximation range defining step, an overlap of the plurality of single direction transmittance approximation ranges determined based on the plurality of gradation-transmittance characteristics is defined as the transmittance approximation range to be referred to in the parameter determining step.

According to a third aspect of the present invention, in the first aspect of the present invention, in the transmittance approximation range defining step, a width of the transmittance to be defined as the transmittance approximation range is gradually increased until a combination of the gradation values of red, green, and blue that enables a target color temperature to be realized in front view comes to exist within the transmittance approximation range.

According to a fourth aspect of the present invention, in the third aspect of the present invention, the transmittance approximation range defining step includes:

an initial step of setting a variable indicating the width of the transmittance to a predetermined initial value;

a candidate range determining step of determining a candidate range, based on the gradation-transmittance characteristic, the candidate range being a range of the gradation value in which the difference between the maximum value and the minimum value among the three transmittances corresponding to each of the gradation values is not more than a value of the variable;

a determination step of determining whether or not the combination of the gradation values of red, green, and blue that enables the target color temperature to be realized in front view exists within the candidate range;

a variable value increase step of increasing the value of the variable in accordance with a predetermined rule, when a negative determination is made in the determination step; and a range decision step of defining the candidate range as the transmittance approximation range to be referred to in the parameter determining step, when affirmative determination is made in the determination step, wherein in first round of the candidate range determining step, the candidate range is determined based on the variable set in the initial step, and in second or later round of the candidate range determining step, the candidate range is determined based on the variable whose value is increased in the variable value increase step.

According to a fifth aspect of the present invention, in the first aspect of the present invention, in the transmittance approximation range defining step, a range of the gradation value in which the difference between the maximum value and the minimum value among the three transmittances corresponding to each of the gradation values is not more than 5% is defined as the transmittance approximation range.

A sixth aspect of the present invention is directed to a liquid crystal display device which includes a liquid crystal panel having three color filters of red, green, and blue which are different from one another in thickness, and displays an image in the liquid crystal panel based on an input image signal indicating a gradation value of each of the colors, the liquid crystal display device comprising:

a white balance adjustment unit that corrects the gradation value of each of the colors based on the input image signal, by using a white balance parameter which is determined so as to correspond to each of the gradation values for each of the colors; and a panel drive unit that drives the liquid crystal panel based on gradation values after correction by the white balance adjustment unit, wherein the white balance parameter is determined for each of the colors of red, green and blue, based on a gradation-transmittance characteristic so that a maximum gradation value of each of the colors after the correction by the white balance adjustment unit is set to the gradation value within a transmittance approximation range, the gradation-transmittance characteristic indicating a relationship between a gradation value and a transmittance regarding each of the three color filters when the liquid crystal panel is viewed from an oblique direction, and the transmittance approximation range being a range of the gradation value in which a difference between a maximum value and a minimum value among three transmittances corresponding to each of the gradation values is minute.

According to a seventh aspect of the present invention, in the sixth aspect of the present invention, the transmittance approximation range is set to a range of the gradation value in which the difference between the maximum value and the minimum value among the three transmittances corresponding to each of the gradation values is not more than 5%, based on the gradation-transmittance characteristic.

According to an eighth aspect of the present invention, in the sixth aspect of the present invention, the liquid crystal panel enables gradation display of 256 gradations, and a range of the gradation value of 170 to 200 is defined as the transmittance approximation range.

Effects of the Invention

According to a first aspect of the present invention, the gradation-transmittance characteristic when the liquid crystal panel is viewed from the oblique direction is acquired, and the range of the gradation value in which the difference between the maximum value and the minimum value among the three transmittances corresponding to each of the gradation values is minute is defined as the transmittance approximation range. The white balance parameter is determined so that the maximum gradation value of each of the colors after the correction by the white balance adjustment is set to the gradation value within the transmittance approximation range, and the relevant white balance parameter is used to perform the white balance adjustment. This allows the expression of full white to be performed in the range of the gradation value in which the difference in transmittance among the three color filters of red, green, and blue is minute. As a result, the balance of red, green, and blue becomes favorable in all the gradations, and the occurrence of the colored phenomenon when oblique view is performed in any gradation is suppressed. Here, as compared with the configuration of the conventional liquid crystal display device, only limitation to a setting range of the white balance parameter is added. Thus, the display quality in oblique view is improved at low cost and with ease in the liquid crystal display device employing the multi-gap structure.

According to a second aspect of the present invention, the white balance parameter is determined based on the plurality of gradation-transmittance characteristics which are obtained by oblique view from the plurality of viewpoints. Accordingly, this not only improves the display quality in oblique view from a certain direction but also improves the display quality in oblique view from the plurality of directions.

According to a third aspect of the present invention, the transmittance approximation range is determined while gradually expanding the range until the combination of the gradation values of red, green, and blue that enables the target color temperature to be realized is obtained. Thereby, the expression of full white is performed in the range of the gradation value in which the difference in transmittance among the three color filters is as small as possible. Accordingly, the occurrence of the colored phenomenon when the oblique view is performed is effectively suppressed while keeping the balance of red, green, and blue in a favorable state.

According to a fourth aspect of the present invention, similarly to the third aspect of the present invention, the occurrence of the colored phenomenon when the oblique view is performed is effectively suppressed while keeping the balance of red, green, and blue in a favorable state.

According to a fifth aspect of the present invention, the expression of full white is performed in the range of the gradation value in which the difference in transmittance among the three color filters of red, green, and blue is not more than 5%. Accordingly, similarly to the first aspect of the present invention, the display quality in oblique view is improved at low cost and with ease in the liquid crystal display device employing the multi-gap structure.

According to a sixth aspect of the present invention, the liquid crystal display device employing the multi-gap structure is realized at low cost and with ease in which the display quality in oblique view is enhanced as compared with that in the related art.

According to a seventh aspect of the present invention, the expression of full white is performed in the range of the gradation value in which the difference in transmittance among the three color filters of red, green, and blue is not more than 5%. Accordingly, similarly to the sixth aspect of the present invention, the liquid crystal display device employing the multi-gap structure is realized at low cost and with ease in which the display quality in oblique view is enhanced as compared with that in the related art.

According to an eighth aspect of the present invention, the liquid crystal display device which enables the gradation display of 256 gradations is realized in which a similar effect to that of the sixth aspect of the present invention is obtained.

BRIEF DESCRIPTION OF THE DRAWINGS

FIG. 9 is a diagram schematically showing the white balance adjustment LUT at a stage where gradation values after correction of respective colors corresponding to a maximum value of an input gradation value are obtained in the first embodiment.

FIG. 10 is a diagram for describing a combination of the gradation values for expressing full white in the first embodiment.

FIG. 11 is a diagram for describing correction of the gradation values by white balance adjustment in the first embodiment.

MODES FOR CARRYING OUT THE INVENTION

Hereinafter, embodiments of the present invention will be described with reference to the accompanying drawings.

1. First Embodiment 1.1 Entire configuration and operation outline

Figure 2:
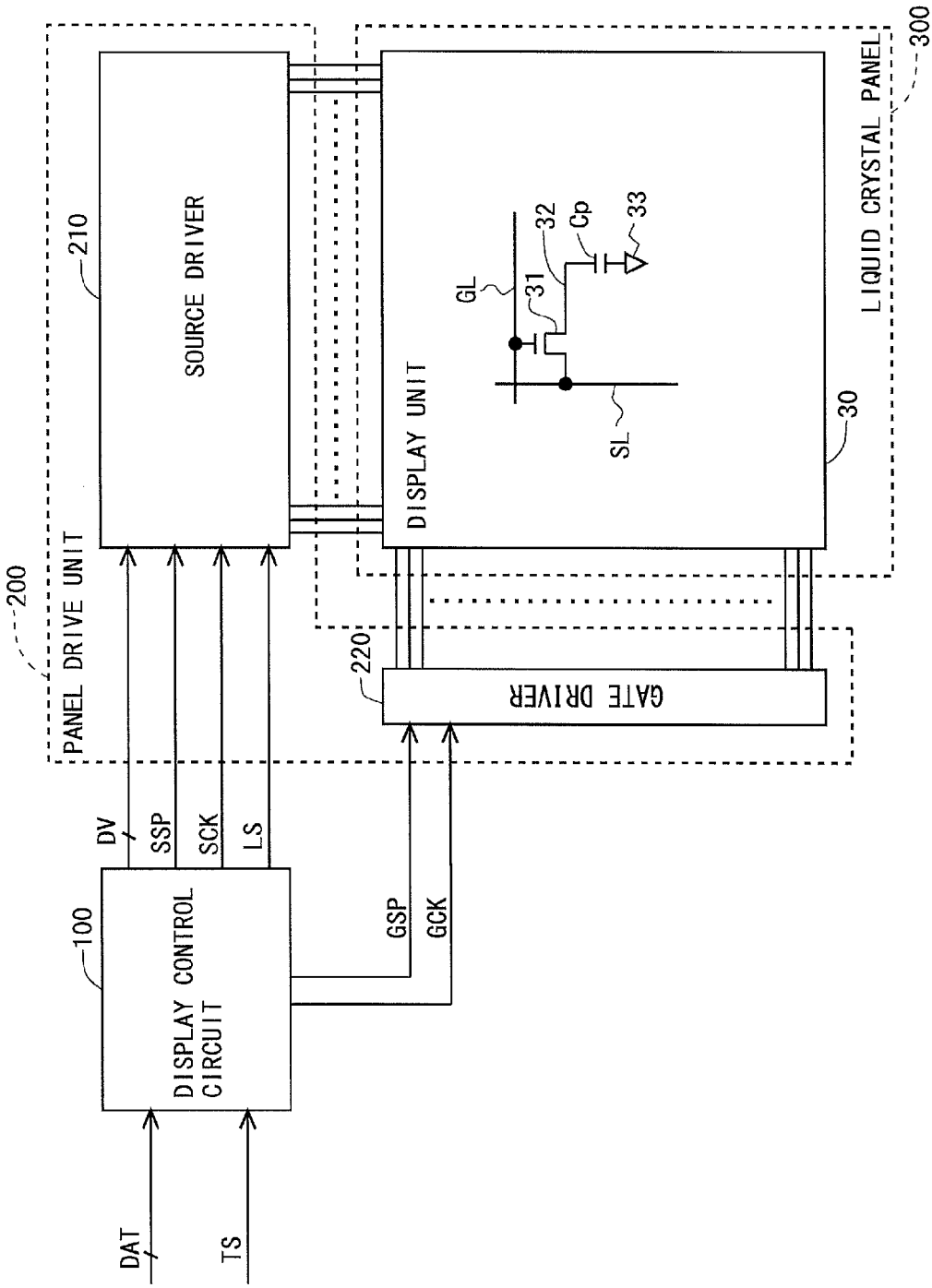
FIG. 2 is a block diagram showing an entire configuration of a liquid crystal display device in the first embodiment.

FIG. 2 is a block diagram showing an entire configuration of a liquid crystal display device according to a first embodiment of the present invention. This liquid crystal display device is configured by a display control circuit 100, a panel drive unit 200 including a source driver (a video signal line drive circuit) 210 and a gate driver (a scanning signal line drive circuit) 220, and a liquid crystal panel 300 including a display unit 30. It should be noted that the source driver 210 and the gate driver 220 may be included in the liquid crystal panel 300. In the display unit 30, a plurality of source bus lines (video signal lines) SL and a plurality of gate bus lines (scanning signal lines) GL are disposed. Pixel formation portions each forming a pixel are provided, corresponding to respective intersections of the source bus lines SL and the gate bus lines GL. That is, the display unit 30 includes the plurality of pixel formation portions. The plurality of pixel formation portions are arranged in a matrix to constitute a pixel array. Each of the pixel formation portions include a thin film transistor (TFT) 31, which is a switching element having a gate terminal connected to the gate bus line GL passing the corresponding intersection and a source terminal connected to the source bus line SL passing the relevant intersection, a pixel electrode 32 connected to a drain terminal of the thin film transistor 31, a common electrode 33 which is an opposite electrode to supply a potential common to the plurality of pixel formation portions, and a liquid crystal layer that is provided commonly to the plurality of pixel formation portions and is sandwiched between the pixel electrode 32 and the common electrode 33. A liquid crystal capacitance formed by the pixel electrode 32 and the common electrode 33 configures a pixel capacitance Cp. Generally, an auxiliary capacitance is provided in parallel to the liquid crystal capacitance in order to reliably hold a voltage in the pixel capacitance Cp; however, description and illustration of the auxiliary capacitance will be omitted because the auxiliary capacitance is not directly related to the present invention. It should be noted that, inside the display unit 30 in FIG. 2, only the components corresponding to the one pixel formation portion are shown.

Next, operation of the components shown in FIG. 2 will be described. The display control circuit 100 receives an input image signal DAT and a timing signal TS such as a horizontal synchronizing signal, a vertical synchronizing signal, and the like from an outside, and outputs a digital video signal DV, a source start pulse signal SSP, a source clock signal SCK, and a latch strobe signal LS which are for controlling operation of the source driver 210, and a gate start pulse signal GSP and a gate clock signal GCK which are for controlling operation of the gate driver 220.

The panel drive unit 200 includes the source driver 210 and the gate driver 220, and drives the liquid crystal panel 300 based on the output signals from the display control circuit 100. The source driver 210 receives the digital video signal DV, the source start pulse signal SSP, the source clock signal SCK, and the latch strobe signal LS which are outputted from the display control circuit 100, and applies a driving video signal to each of the source bus lines SL. At this time, in the source driver 210, the digital video signal DV indicating a voltage to be applied to each of the source bus lines SL is sequentially held at timing when a pulse of the source clock signal SCK is generated. The held digital video signal DV is converted into an analog voltage at timing when a pulse of the latch strobe signal LS is generated. Then, the converted analog voltage is simultaneously applied to all the source bus lines SL as the driving video signal. The gate driver 220 repeats application of an active scanning signal to each of the gate bus lines GL with one vertical scanning period used as a cycle, based on the gate start pulse signal GSP and the gate clock signal GCK which are outputted from the display control circuit 100.

As described above, the driving video signal is applied to each of the source bus lines SL, and the scanning signal is applied to each of the gate bus lines GL, whereby an image based on the input image signal DAT is displayed in the display unit 30 of the liquid crystal panel 300. It should be noted that, in the following, a description will be given on the assumption that this liquid crystal display device enables gradation expression of 256 gradations for each color.

1.2 Structure of Liquid Crystal Panel

Figure 3:
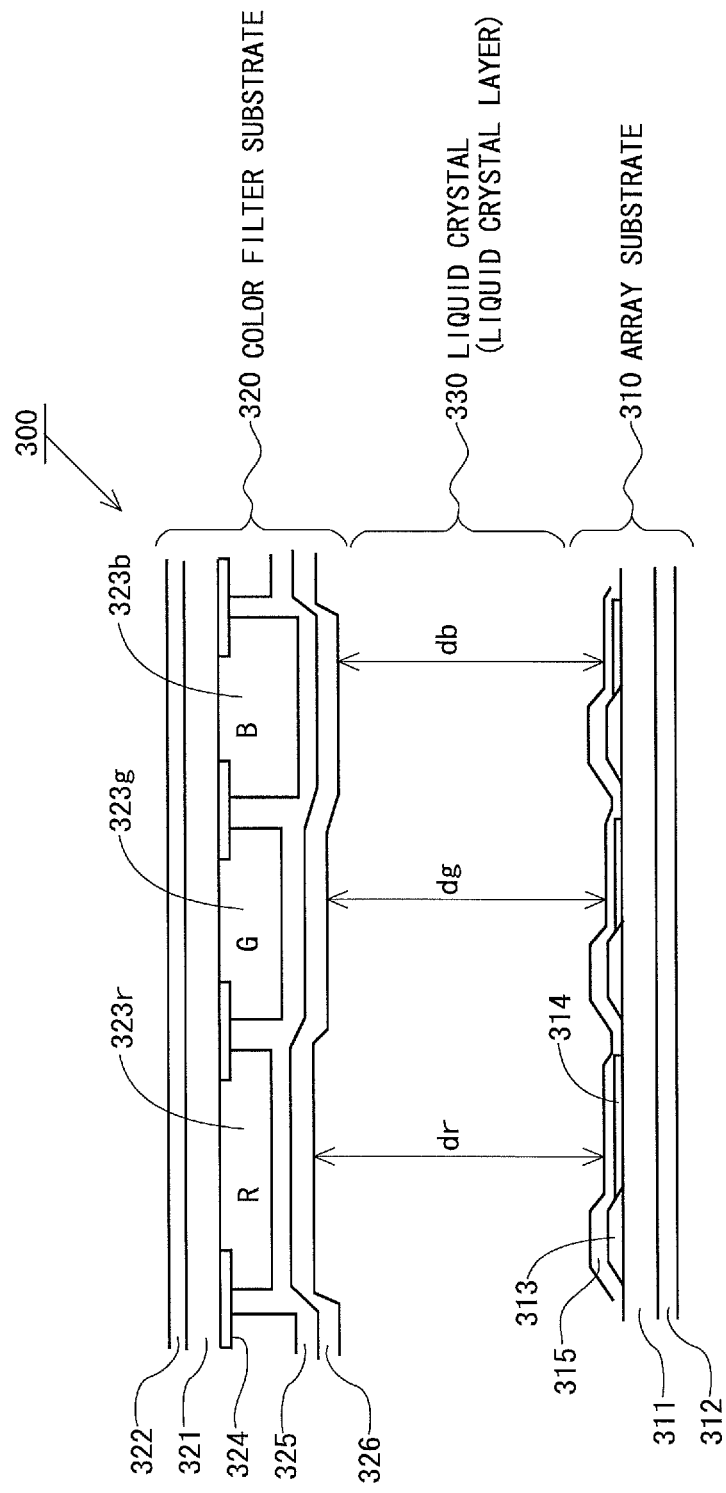
FIG. 3 is a cross-sectional diagram of a liquid crystal panel in the first embodiment.

FIG. 3 is a cross-sectional diagram of the liquid crystal panel 300 in the present embodiment. This liquid crystal panel 300 is configured by an array substrate 310 and a color filter substrate 320, which are a pair of electrode substrates. The array substrate 310 and the color filter substrate 320 are arranged so as to be opposed to each other with a liquid crystal 330 sandwiched therebetween.

The array substrate 310 is configured by a glass substrate 311, a polarizing plate 312 pasted to the glass substrate 311 to control a transmission amount of light, thin film transistors (TFT) 313 and pixel electrodes 314 which are formed on the glass substrate 311, an oriented film 315 formed on the thin film transistors 313 and the pixel electrodes 314 so that liquid crystal molecules are arrayed in a fixed direction.

The color filter substrate 320 is configured by a glass substrate 321, a polarizing plate 322 pasted to the glass substrate 321 to control the transmission amount of the light, R, G, and B color filters (colored layers) 323r, 323g, and 323b which are formed on the glass substrate 321, a black matrix 324 provided between these colored filters to prevent leakage of light, a transparent conductive film 325 formed on the color filters with a protective film (not shown) or the like therebetween, and an oriented film 326 formed on the transparent conductive film 325 so that the liquid crystal molecules are arrayed in a fixed direction.

Here, when thicknesses of the liquid crystal layers 330 corresponding to the R, G, and B color filters 323r, 323g, and 323b are defined as dr, dg, and db, a relationship of "dr>dg>db" is established in the present embodiment. In other words, the thickness of the G color filter 323g is larger than the thickness of the R color filter 323r, and the thickness of the B color filter 323b is larger than the thickness of the G color filter 323g. As described above, in the liquid crystal display device according to the present embodiment, the liquid crystal panel 300 having a multi-gap structure is employed.

1.3 Display Control Circuit

Figure 4:
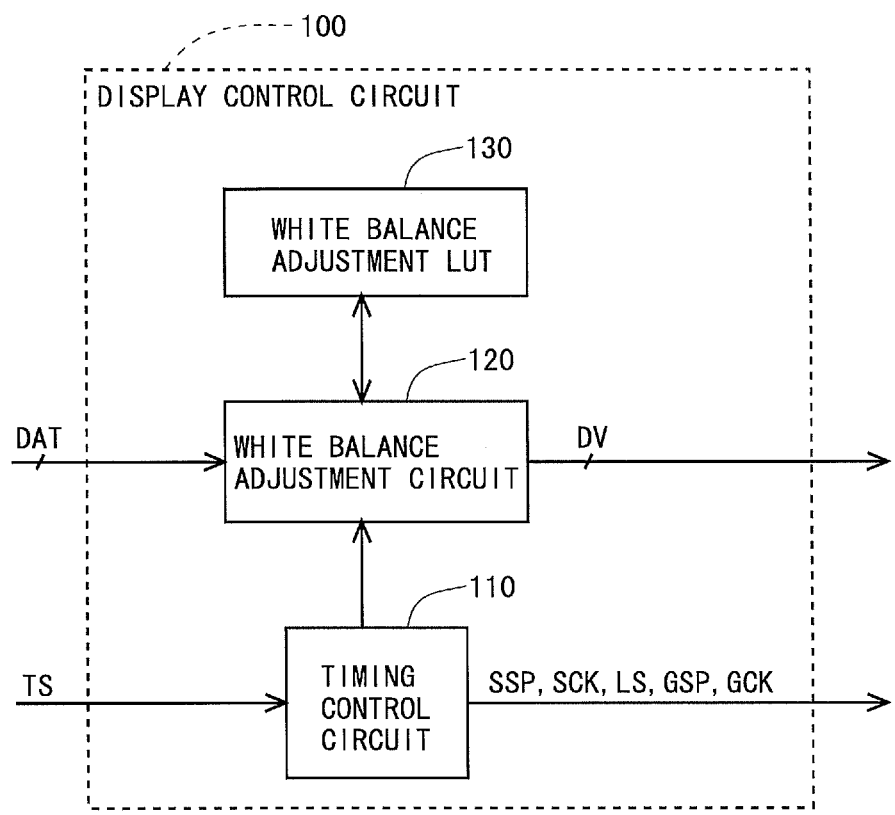
FIG. 4 is a block diagram showing a configuration of a display control circuit in the first embodiment.

FIG. 4 is a block diagram showing a configuration of the display control circuit 100 in the present embodiment. This display control circuit 100 includes a timing control circuit 110, a white balance adjustment circuit 120, and a white balance adjustment LUT (lookup table) 130.

The timing control circuit 110 controls operation of the white balance adjustment circuit 120 based on the timing signal TS which is sent from the outside, and outputs the source start pulse signal SSP, the source clock signal SCK, and the latch strobe signal LS which are for controlling the operation of the source driver 210, and the gate start pulse signal GSP and the gate clock signal GCK which are for controlling the operation of the gate driver 220.

Figure 5:
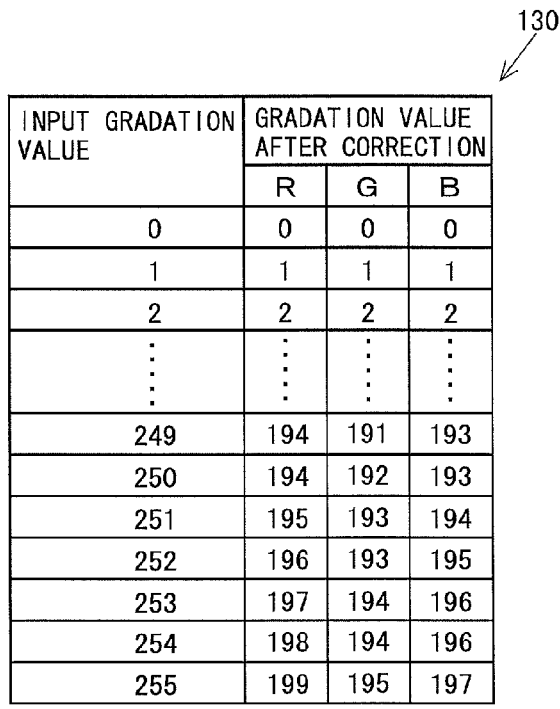
FIG. 5 is a diagram schematically showing one example of a white balance adjustment LUT in the first embodiment.

The white balance adjustment circuit 120 performs the white balance adjustment that applies correction for each of the colors to a value (gradation value) of gradation data included in the input image signal DAT so that white is properly displayed regardless of a color temperature of a backlight light source. The white balance adjustment LUT 130 is a table prepared for this white balance adjustment. As shown in FIG. 5, in the white balance adjustment LUT 130, an input gradation value (a gradation value included in the input image signal DAT) and a gradation value after correction (a gradation value after the white balance adjustment) for each of R (red), G (green), and B (blue) are associated with each other. For example, as to data of R having the input gradation value of "250", the gradation value after correction is set to "194". In this manner, the white balance adjustment circuit 120 applies the correction to the input image signal DAT based on the white balance adjustment LUT 130, and outputs the digital video signal DV indicating the above-described gradation values after correction. It should be noted that a parameter indicating the gradation value after correction corresponding to each of the input gradation values for each of R, G, and B is referred to as a "white balance parameter". In the example shown in FIG. 5, for all the colors, the values of the white balance parameter are 200 or less.

1.4 Viewing Angle Characteristic Improving Method

Figure 6:
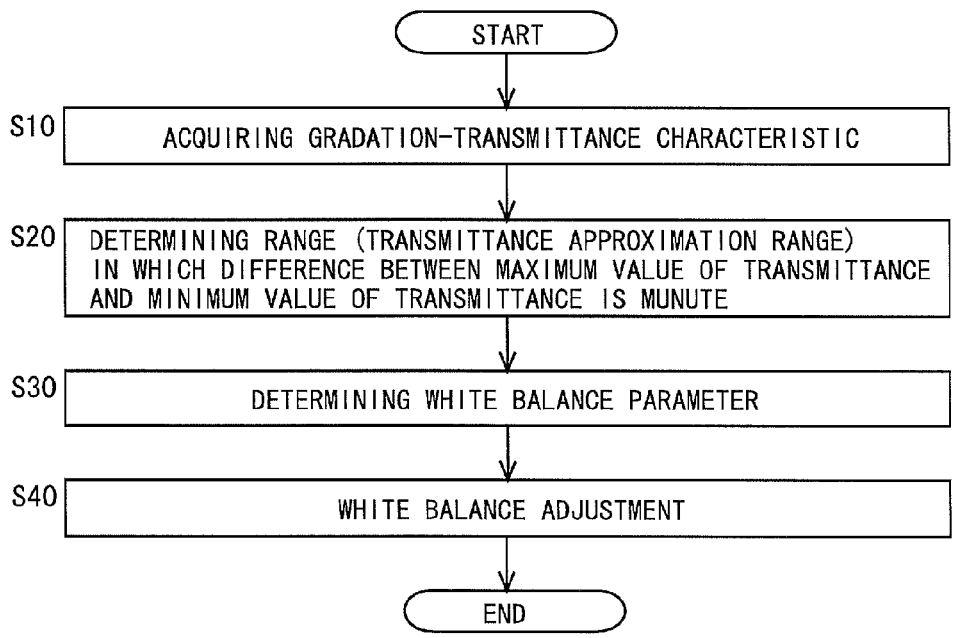
FIG. 6 is a flowchart showing a procedure for improving a viewing angle characteristic in the first embodiment.

Next, in the present embodiment, a method for improving a viewing angle characteristic of the liquid crystal display device will be described. FIG. 6 is a flowchart showing a procedure for improving the viewing angle characteristic in the present embodiment. It should be noted that, as to FIG. 6, processing from step S10 to step S30 is processing performed in a factory or the like where the liquid crystal display device is manufactured, and step S40 is processing to be performed when the liquid crystal display device actually operates.

Figure 7:
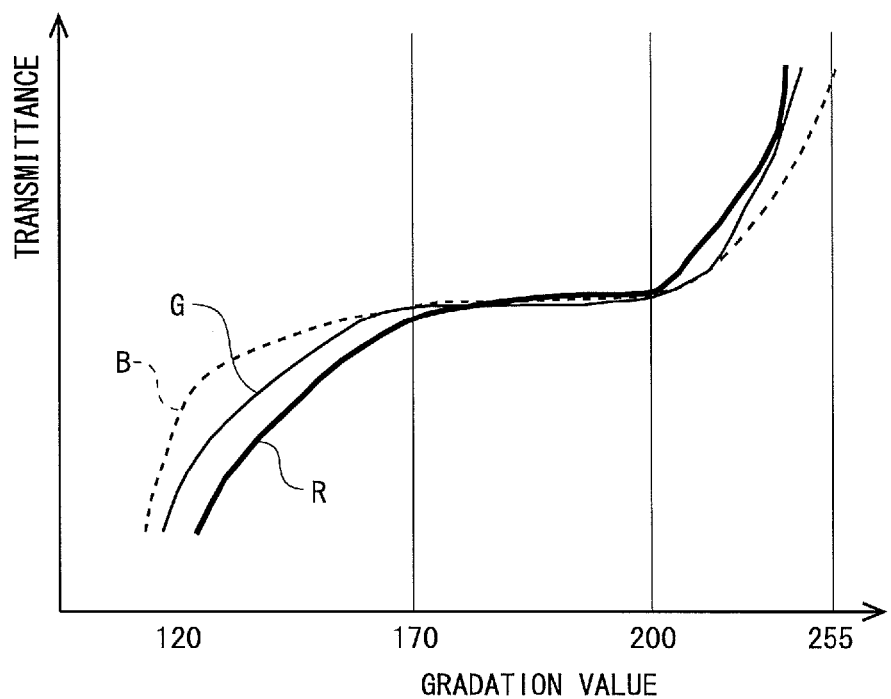
FIG. 7 is a diagram showing one example of a gradation-transmittance characteristic in the first embodiment.

First, a gradation-transmittance characteristic indicating a relationship between the gradation value and a transmittance regarding each of the three color filters when the liquid crystal panel 300 of the target liquid crystal display device is viewed from an oblique direction is obtained (step S10). The gradation-transmittance characteristic is obtained, for example, by measuring the transmittance corresponding to each of the input gradation values, using a spectral luminance meter from an angle where the characteristic is desired to be obtained. The gradation-transmittance characteristic obtained in this step S10 is expressed, for example, as shown in FIG. 7. In FIG. 7, the characteristic of R is indicated by a thick solid line, the characteristic of G is indicated by a thin solid line, and the characteristic of B is indicated by a thin dotted line. In an example shown in FIG. 7, in an area of relatively low gradations, the transmittances are "B>G>R", while in an area of relatively high gradations, the transmittances are "R>G>B". It should be noted that, in the present embodiment, it is assumed that only the gradation-transmittance characteristic when the liquid crystal panel 300 is viewed from a certain oblique direction is obtained. That is, in the present embodiment, the processing for improving the viewing angle characteristic is performed based on only the one gradation-transmittance characteristic.

Next, a range of the gradation value in which a difference between a maximum value of the transmittance and a minimum value of the transmittance is minute (hereinafter, referred to as a "transmittance approximation range") is obtained, based on the gradation-transmittance characteristic obtained in step S10 (step S20). Here, the maximum value of the transmittance is a value of the maximum transmittance among three transmittances of R, B, and G corresponding to each of the gradation values. Similarly, the minimum value of the transmittance is a value of the minimum transmittance among the three transmittances of R, B, and G corresponding to each of the gradation values.

Figure 8:
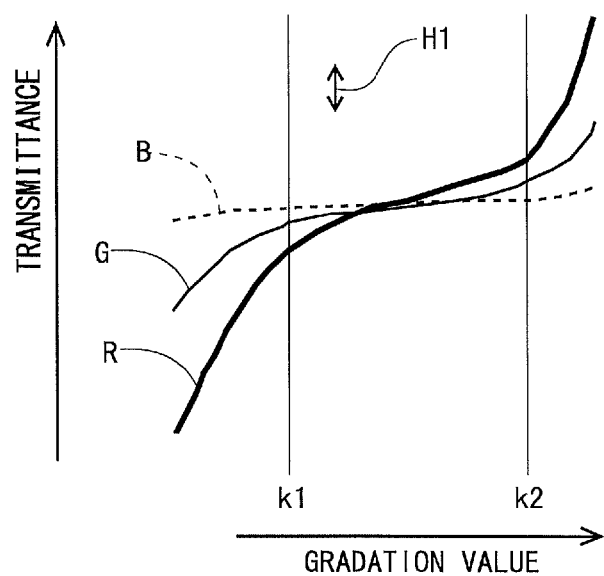
FIG. 8 is a diagram for describing a transmittance approximation range in the first embodiment.

In order to obtain the transmittance approximation range, for each of the gradation values, the difference between the maximum value of the transmittance and the minimum value of the transmittance is compared with a predetermined threshold value (refer to H1 in FIG. 8). Then, an aggregation of the gradation values in which the difference is not more than the threshold value is defined as the transmittance approximation range. In an example shown in FIG. 8, the difference between the maximum value of the transmittance and the minimum value of the transmittance is not more than the threshold value H1 in the gradation values of k1 to k2. Accordingly, a range of the gradation value of k1 to k2 is defined as the transmittance approximation range. As described above, in the example shown in FIG. 7, for example, a range of the gradation value of 170 to 200 is defined as the transmittance approximation range.

By the way, the threshold value H1 is, for example, 0.05 (5%). That is, when the transmittance is expressed by 0% to 100%, for example, a range of the gradation value in which the difference between the maximum value of the transmittance and the minimum value of the transmittance is 5% or less is the transmittance approximation range. However, the threshold value H1 is not limited to 0.05 (5%). It may be determined for each liquid crystal display device in accordance with a request regarding display quality by a user, or the like.

Next, processing for determining the white balance parameter for adjusting the white balance of the liquid crystal panel 300 is performed (step S30). The white balance parameter is obtained for each of the colors and for each of the gradation values. In the present embodiment, as the white balance parameter, first, the gradation value after correction of each of the colors corresponding to a maximum value of the input gradation value is obtained. At this time, the gradation values after correction are the set to gradation values within the above-described transmittance approximation range regarding all the colors. Accordingly, in the case where the range of the gradation value of 170 to 200 is defined as the transmittance approximation range, as described above, for example, it leads "the gradation value after correction of R=199, the gradation value after correction of G=195, and the gradation value after correction of B=197".

FIG. 9 is a diagram schematically showing the white balance adjustment LUT 130 at a stage where the gradation values after correction of the respective colors corresponding to the maximum value of the input gradation value are obtained. From a row indicated by reference numeral 131 in FIG. 9, it can be understood that a combination of the gradation values for expressing full white is "R=199, G=195, B=197" in place of "R=255, G=255, B=255" (refer to FIG. 10). It should be noted that, as in a row indicated by reference numeral 132 in FIG. 9, the gradation values after correction of the respective colors corresponding to a minimum value (0) of the input gradation value are normally set to "0". After the gradation values after correction of the respective colors corresponding to the maximum value of the input gradation value are obtained as described above, the gradation values after correction of the respective colors corresponding to values other than the maximum value/the minimum value of the input gradation value are obtained. Thus, the white balance adjustment LUT 130 as shown in FIG. 5, for example, is generated.

As described above, in step S30, the white balance parameter is determined so that the maximum gradation value of each of the colors (the gradation value after correction corresponding to the maximum value of the input gradation value) is set to the gradation value within the transmittance approximation range by the correction of the gradation value by the white balance adjustment (step S40). Then the white balance adjustment LUT generated in this step S30 is provided in the display control circuit 100 of the target liquid crystal display device.

Next, during operation of the liquid crystal display device, the white balance adjustment is performed, using the white balance adjustment LUT 130 which is generated in step S30 (step S40). That is, during operation of the liquid crystal display device, the values (gradation values) of the gradation data included in the input image signal DAT are corrected based on the white balance adjustment LUT 130, and the image display based on the gradation values after correction is performed. In the case where the white balance adjustment LUT 130 as shown in FIG. 5 is provided in the display control circuit 100 of the liquid crystal display device, if pixel data in which the input gradation values of R, G, and B are "249", "254", and "250", respectively exists, the gradation values of R, G, and B regarding the relevant pixel data are corrected to "194", "194", and "193" by the white balance adjustment, as shown in FIG. 11.

In the present embodiment, in order to improve the viewing angle characteristic in the liquid crystal display device, the above-described processing is performed. It should be noted that, although the description has been given on the assumption that the liquid crystal display device enables gradation expression of 256 gradations for each of the colors, the present invention can also be applied to a liquid crystal display device that enables gradation expression of more than 256 gradations, or less than 256 gradations. Moreover, the present invention can be applied even if the number of gradations of the input image signal DAT and the number of gradations that the liquid crystal display device can express are different (e.g., in the case where the number of gradations of the input image signal DAT is 256, and the liquid crystal display device enables the gradation expression of 1024 gradations for each of the colors).

It should be noted that, in the present embodiment, a characteristic acquisition step is realized by step S10, a transmittance approximation range defining step is realized by step S20, a parameter determining step is realized by step S30, and a white balance adjustment step is realized by step S40.

1.5 Effects

Figure 1:
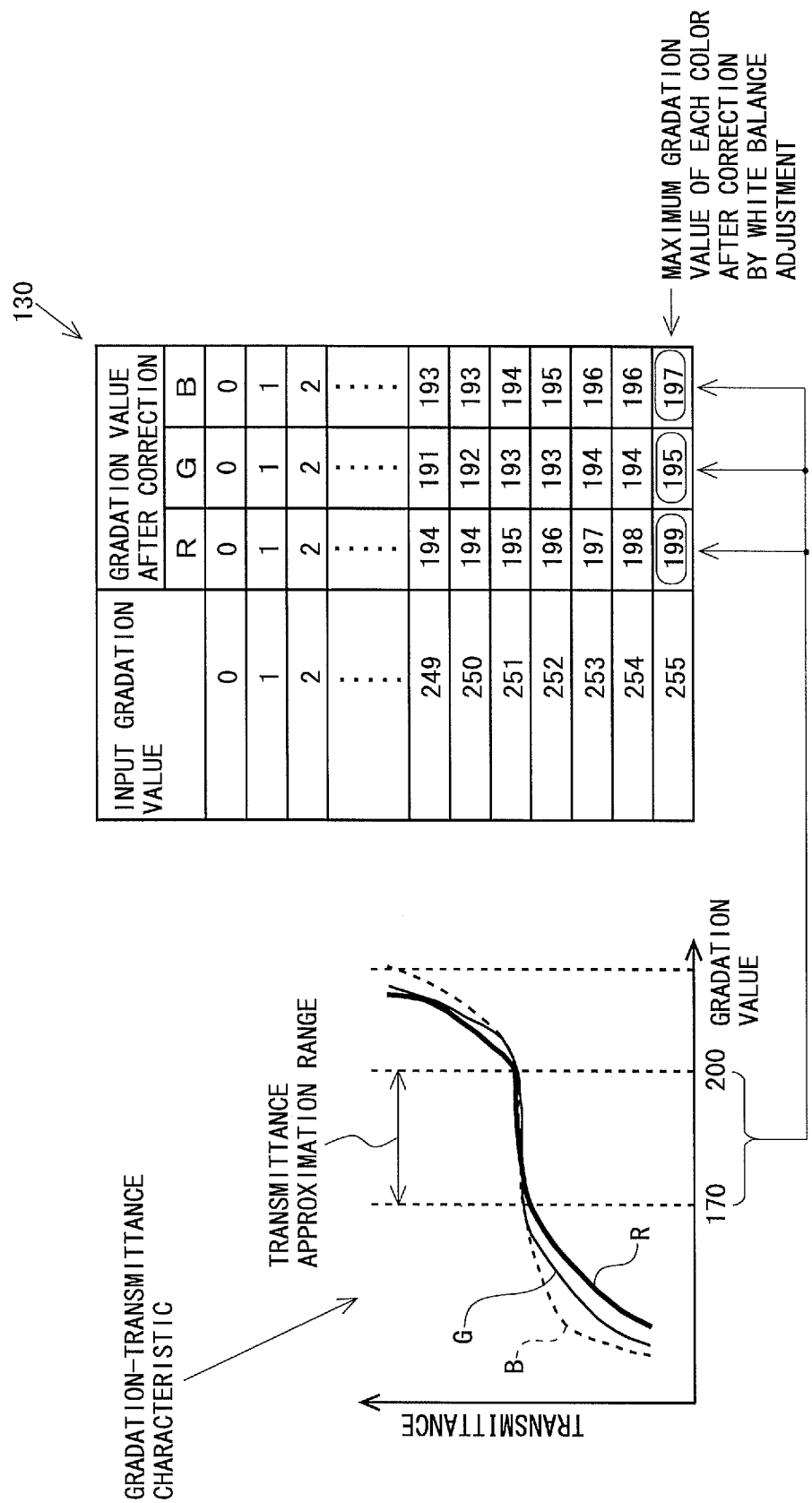
FIG. 1 is a diagram for describing effects of a first embodiment of the present invention.

Referring to FIG. 1, effects in the present embodiment will be described. According to the present embodiment, the gradation-transmittance characteristic when the liquid crystal panel is viewed from an oblique direction is obtained, and the range of the gradation value in which the difference between the maximum value and the minimum value of the three transmittances corresponding to each of the gradation values is minute is defined as the transmittance approximation range. Then, the white balance parameter is determined so that the maximum gradation value of each of the colors after the correction by the white balance adjustment is set to the gradation value within the transmittance approximation range, and the white balance adjustment is performed using the white balance parameter. This allows the expression of full white to be performed in the range of the gradation value in which the difference in the transmittance among the three color filters is minute. As a result, balance of R, G, and B in all the gradations becomes favorable, and occurrence of a colored phenomenon when the oblique view is performed in any gradation is suppressed. Thus, a target color temperature can be realized in front view, and the display quality in oblique view is improved. Moreover, since only the limitation to a setting range of the white balance parameter is added as compared with a configuration of a conventional liquid crystal display device, the display quality in oblique view can be improved at low cost and with ease.

2. Second Embodiment

2.1 Configuration and the Like

A second embodiment of the present invention will be described. An entire configuration, a structure of a liquid crystal panel 300, and a configuration of a display control circuit 100 are similar to those in the first embodiment, and thus, descriptions thereof will be omitted (refer to FIGS. 2 to 4).

2.2 Viewing Angle Characteristic Improving Method

Next, in the present embodiment, a method for improving a viewing angle characteristic of a liquid crystal display device will be described. In the first embodiment, the processing for improving the viewing angle characteristic is performed based on only one gradation-transmittance characteristic. In contrast, in the present embodiment, the processing for improving the viewing angle characteristic is performed based on a plurality of gradation-transmittance characteristics, as described below.

Figure 12:
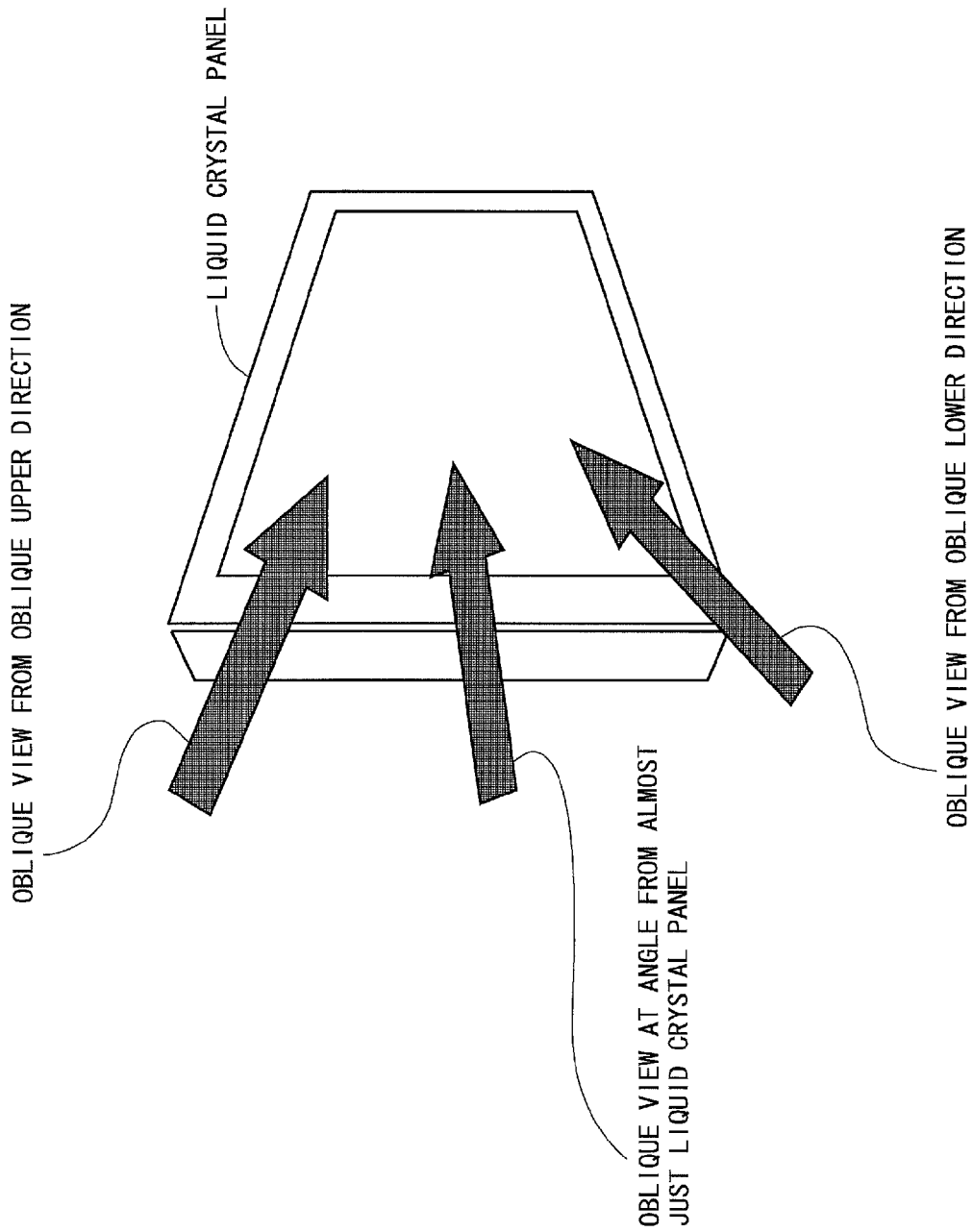
FIG. 12 is a diagram for describing a viewing angle characteristic improving method in a second embodiment of the present invention.
Figure 13:
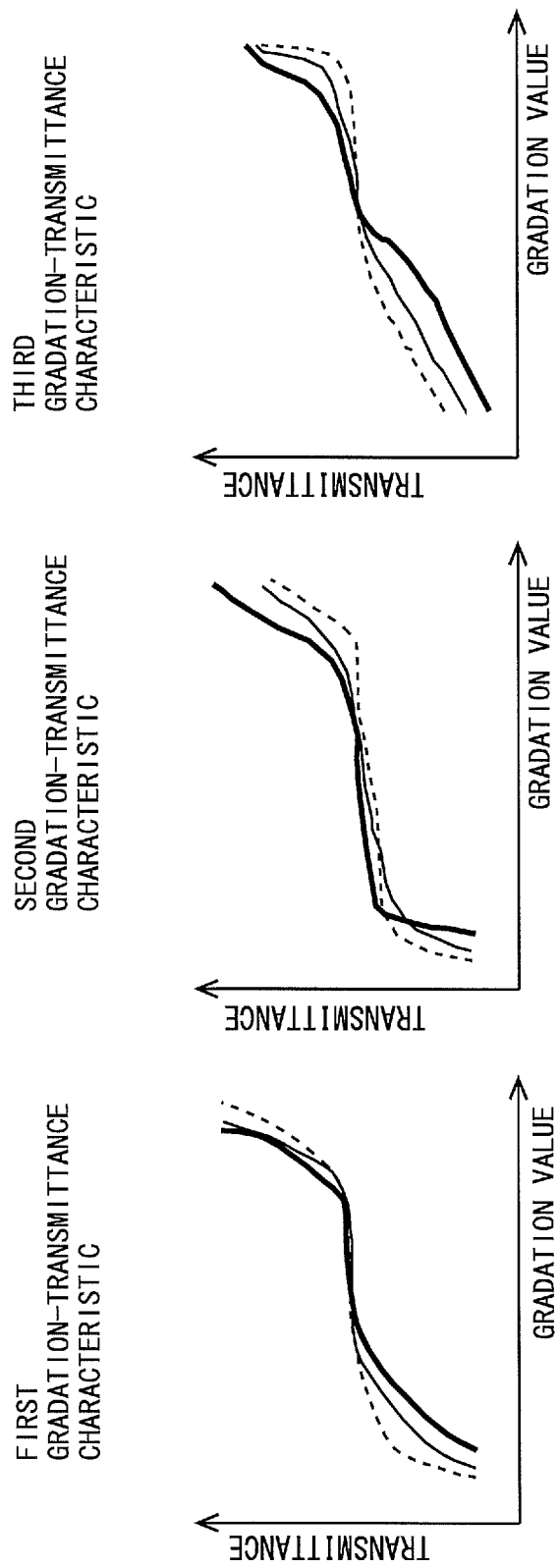
FIG. 13 is a diagram for describing the viewing angle characteristic improving method in the second embodiment.

In the present embodiment, for example, as shown in FIG. 12, measurement of the gradation-transmittance characteristics in oblique view at an angle from almost just beside the liquid crystal panel, in oblique view from an obliquely upper direction, and in oblique view from an obliquely lower direction is performed. Thereby, in step S10 described above (refer to FIG. 6), for example, three gradation-transmittance characteristics as shown in FIG. 13 (a first gradation-transmittance characteristic, a second gradation-transmittance characteristic, and a third gradation-transmission characteristic) are obtained.

Figure 14:
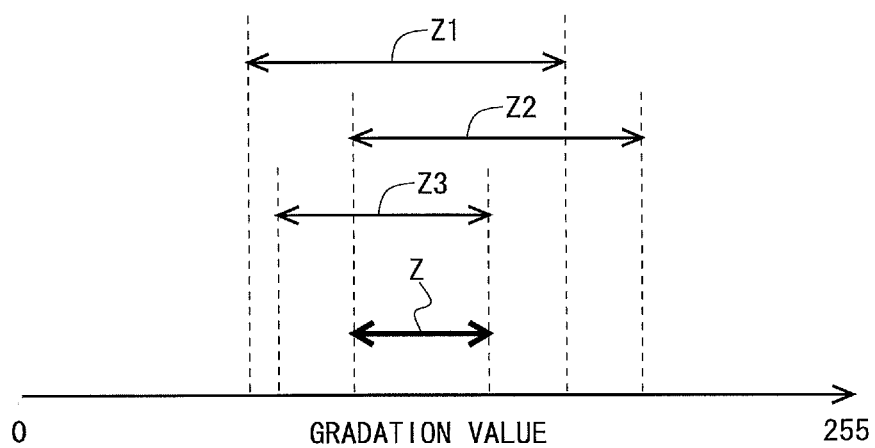
FIG. 14 is a diagram for describing the viewing angle characteristic improving method in the second embodiment.

In step S20 described above, a plurality of transmittance approximation ranges are obtained so as to correspond to the respective plurality of gradation-transmittance characteristics. It should be noted that, here, the transmittance approximation range determined based on one of the gradation-transmittance characteristics is referred to as a "single direction transmittance approximation range". An overlap of the plurality of single direction transmittance approximation ranges is defined as a transmittance approximation range which is used in the processing of step S30 described above. For example, in the case where the single direction transmittance approximation ranges corresponding to the three gradation-transmittance characteristics (the first gradation-transmittance characteristic, the second gradation-transmittance characteristic, and the third gradation-transmittance characteristic) are ranges indicated by reference characters Z1, Z2, and Z3 in FIG. 14, respectively, a range indicated by reference character Z, which is a portion where all of them overlap, is defined as the transmittance approximation range which is used in the processing in step S30.

After the transmittance approximation range is obtained based on the oblique view from the plurality of positions in this manner, processing for determining a white balance parameter (step S30) and processing for adjusting the white balance (step S40) are performed similarly to the first embodiment.

2.3 Effects

According to the present embodiment, the white balance parameter is determined based on the plurality of gradation-transmittance characteristics obtained by oblique view from the plurality of viewpoints. Accordingly, not only the display quality in oblique view from a certain direction is improved, but also the display quality in oblique view from the plurality of directions (e.g., the oblique view when viewed edge-on, the oblique view from the obliquely upper direction, and the oblique view from the obliquely lower direction) is improved.

2.4 Others

By the way, there normally exist a plurality of combinations of the gradation values of R, G, and B that realize one color temperature. However, when a range of the gradation value that allows combinations of R, G, and B is narrow, the target color temperature may not be realized, no matter how the gradation values of R, G, and B are combined. In connection with this, as the number of viewpoints from which the measurement of the gradation-transmittance characteristic is performed is larger, generally, the above-described transmittance approximation range becomes smaller. Accordingly, as the number of the viewpoints from which the measurement of the gradation-transmittance characteristic is performed is larger, a possibility that the target color temperature is not realized becomes higher. Therefore, it is preferable that the viewpoint from which the measurement of the gradation-transmittance characteristic is performed is increased within a range where the target color temperature can be realized.

3. Third Embodiment

3.1 Configuration and the Like

A third embodiment of the present invention will be described. An entire configuration, a structure of a liquid crystal panel 300, and a configuration of a display control circuit 100 are similar to those in the first embodiment, and thus, descriptions thereof will be omitted (refer to FIGS. 2 to 4).

3.2 Viewing Angle Characteristic Improving Method

Next, in the present embodiment, a method for improving a viewing angle characteristic of a liquid crystal display device will be described. In the first embodiment, the transmittance approximation range is determined based on the predetermined threshold value H1. In contrast, in the present embodiment, a transmittance approximation range is determined while gradually expanding the range until a combination of gradation values of R, G, and B that enables a target color temperature to be realized is obtained, as described below.

Figure 15:
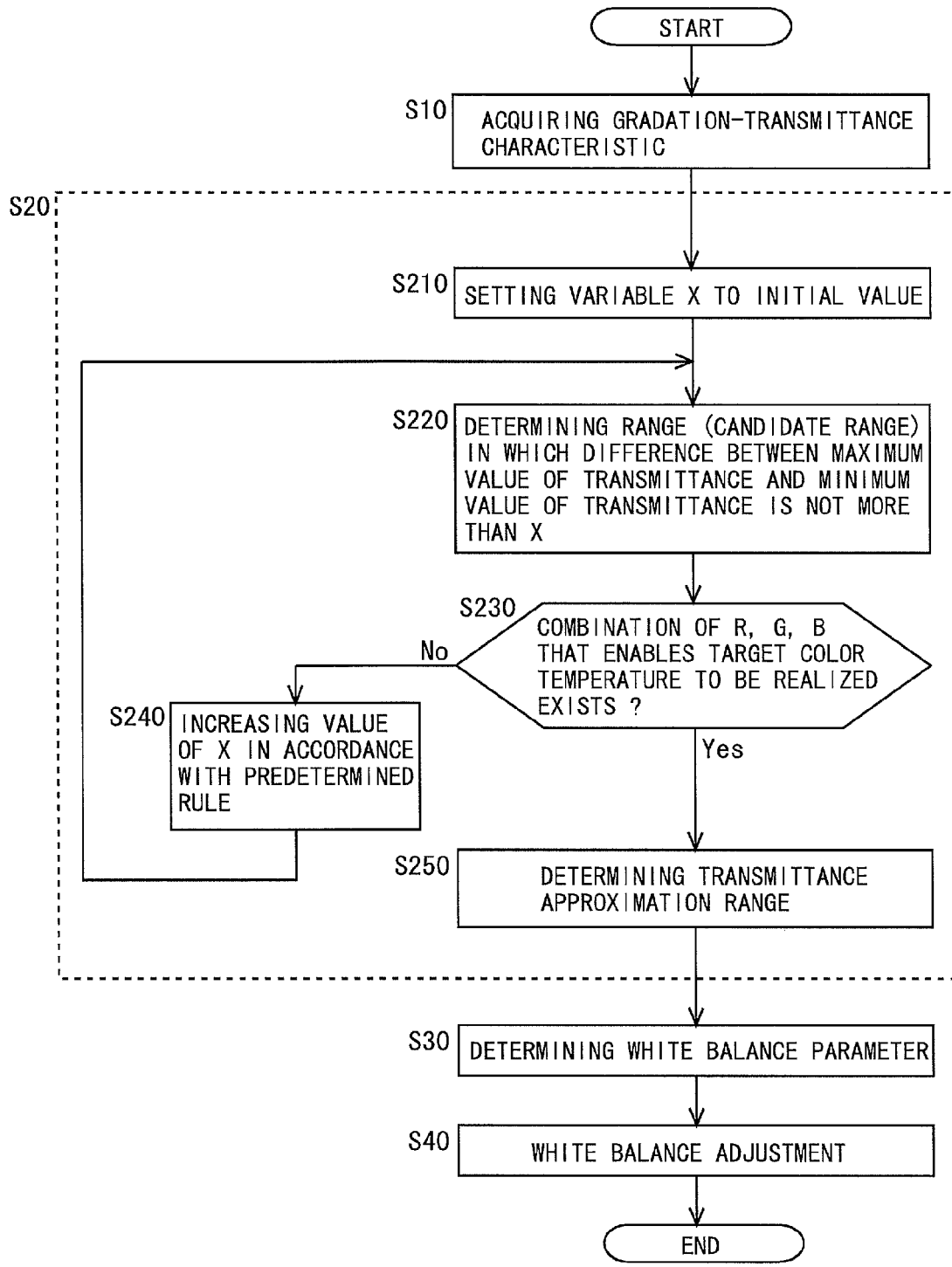
FIG. 15 is a flowchart showing a procedure for improving a viewing angle characteristic in a third embodiment of the present invention.

FIG. 15 is a flowchart showing a procedure for improving a viewing angle characteristic in the present embodiment. In the present embodiment, as shown in FIG. 15, processing in step S20 includes processing in step S210 to step S250. It should be noted that processings in step S10, step S30, and step S40 are similar to those of the first embodiment, and thus, descriptions thereof will be omitted.

After the gradation-transmittance characteristic in oblique view is acquired in step S10, a variable X indicating a width of a transmittance is set to a predetermined initial value (step S210). Next, a range of the gradation value in which a difference between a maximum value of the transmittance and a minimum value of the transmittance is not more than a value of the variable X (hereinafter, referred to as a "candidate range") is obtained (step S220). Furthermore, it is determined whether or not the combination of the gradation values of R, G, and B that enables the target color temperature to be realized in front view exists within the candidate range (step S230). As a result, if the desired combination does not exist, the processing advances to step S240. On the other hand, if the desired combination exists, the processing advances to step S250. In step S240, in accordance with a predetermined rule, the value of the variable X is made larger. For example, the value of the variable X is first set to 1(%) in step S210, and 0.5(%) is added to the value of the variable X in step S240. After the value of the variable X is made larger in step S240 in this manner, the processing returns to step S220. Then, the candidate range is obtained based on the value of the variable X made larger (step S220), and it is determined whether or not the combination of the gradation values of R, G, and B that enables the target color temperature to be realized in front view exists within the candidate range (step S230). As a result, if the desired combination exists, the processing advances to step S250, and otherwise, the processing again advances to step S240. As described above, the foregoing processing is repeated until the combination of the gradation values of R, G, and B that enables the target color temperature to be realized exists within the candidate range.

It should be noted that, in the present embodiment, an initial step is realized by step S210, a candidate range determining step is realized by step S220, a determination step is realized by step S230, a variable value increase step is realized by step S240, and a range decision step is realized by step S250.

Figure 16:
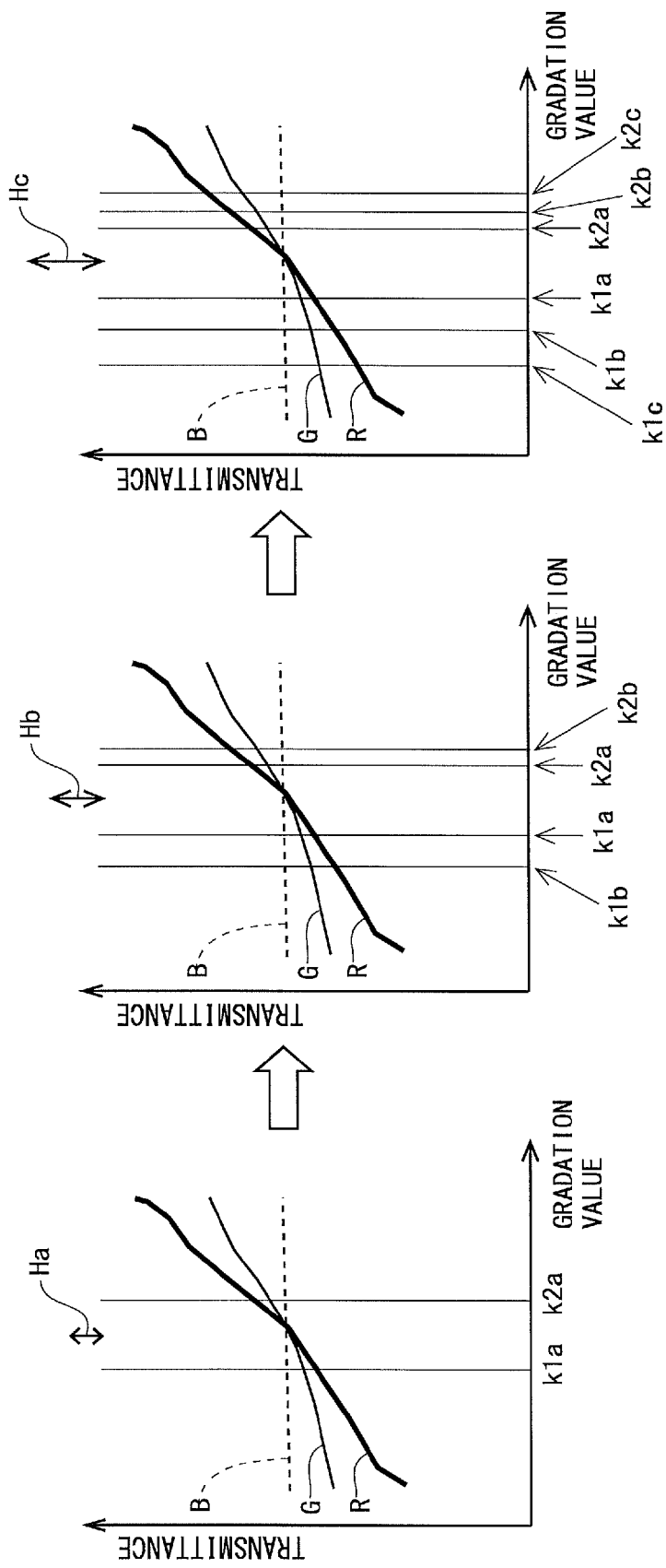
FIG. 16 is a diagram for describing the viewing angle characteristic improving method in the third embodiment.
Figures 17, 18:
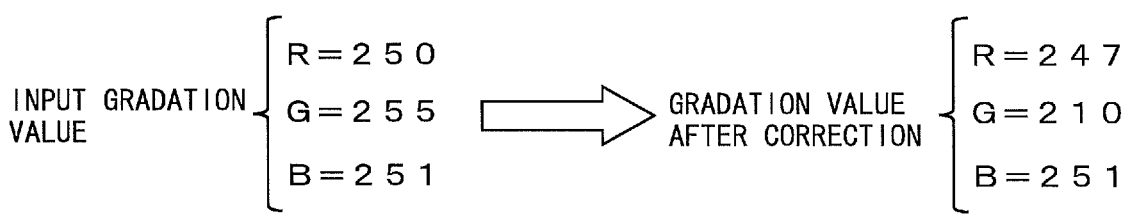
FIG. 17 is a diagram schematically showing one example of a white balance adjustment LUT in a conventional example.
FIG. 18 is a diagram for describing correction of gradation values by white balance adjustment in the conventional example.
Figure 19:
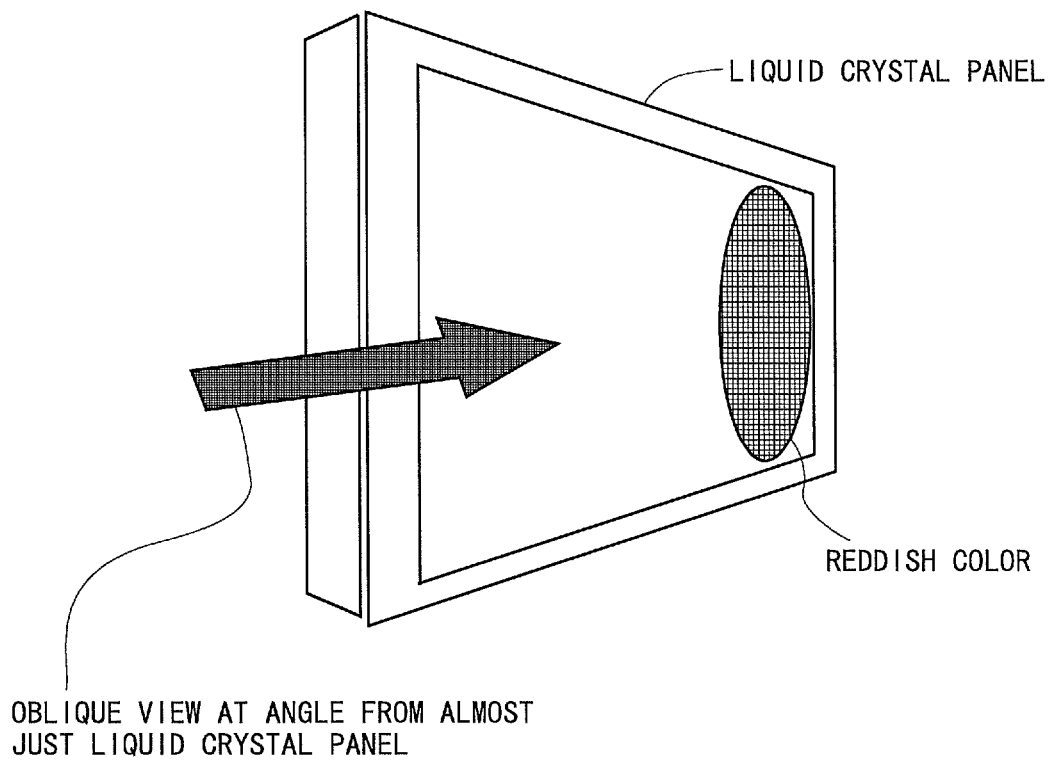
FIG. 19 is a diagram for describing a problem in the conventional example.

Here, referring to FIG. 16, the processings of step S210 to step S250 will be described. For example, first, the value of the variable X is set to a value equivalent to a size of an arrow of reference character Ha, and a range in which the gradation value is not less than k1a and not more than k2a is defined as the candidate range, based on the value of the variable X. If the combination of the gradation values of R, G, and B that enables the target color temperature to be realized does not exist within the range of the gradation value of k1a to k2a, the value of the variable X is set to a value equivalent to a size of an arrow of reference character Hb. It should be noted that the value equivalent to the size of the arrow of reference character Hb is a value obtained by adding a predetermined value to the value equivalent to the size of the arrow of reference character Ha. Next, a range in which the gradation value is not less than k1b and not more than k2b is defined as the candidate range, based on the value of the variable X, which is the value equivalent to the size of the arrow of reference character Hb. If the combination of the gradation values of R, G, and B that enables the target color temperature to be realized does not exist within the range of the gradation value of k1b to k2b, the value of the variable X is set to a value equivalent to a size of an arrow of reference character Hc. It should be noted that the value equivalent to the size of the arrow of reference character Hc is a value obtained by adding a predetermined value to the value equivalent to the size of the arrow of reference character Hb. Next, a range in which the gradation value is not less than k1c and not more than k2c is defined as the candidate range, based on the value of the variable X, which is the value equivalent to the size of the arrow of reference character Hc. As described above, in the present embodiment, the candidate range is gradually expanded until the combination of the gradation values of R, G, and B that enables the target color temperature to be realized is obtained.

3.3 Effects

According to the present embodiment, the transmittance approximation range is determined while gradually expanding the range until the combination of the gradation values of R, G, and B that enables the target color temperature to be realized is obtained. Accordingly, the expression of full white is performed in the range of the gradation value in which the difference in transmittance among the three color filters is as small as possible. Thus, the occurrence of the colored phenomenon when oblique view is performed is effectively suppressed while keeping balance of R, G, and B in a favorable state.

DESCRIPTION OF REFERENCE CHARACTERS

30: DISPLAY UNIT
100: DISPLAY CONTROL CIRCUIT
110: TIMING CONTROL CIRCUIT
120: WHITE BALANCE ADJUSTMENT CIRCUIT
130: WHITE BALANCE ADJUSTMENT LUT
200: PANEL DRIVE UNIT
300: LIQUID CRYSTAL PANEL
310: ARRAY SUBSTRATE
320: COLOR FILTER SUBSTRATE
330: LIQUID CRYSTAL LAYER
323r: RED COLOR FILTER
323g: GREEN COLOR FILTER
323b: BLUE COLOR FILTER

The invention claimed is:

1. A viewing angle characteristic improving method in a liquid crystal display device including a liquid crystal panel having three color filters of red, green, and blue which are different from one another in thickness, the viewing angle characteristic improving method comprising:
   a characteristic acquisition step of acquiring a gradation-transmittance characteristic indicating a relationship between a gradation value and a transmittance regarding each of the three color filters when the liquid crystal panel is viewed from an oblique direction;
   a transmittance approximation range defining step of determining a transmittance approximation range, which is a range of the gradation value in which a difference between a maximum value and a minimum value among three transmittances corresponding to each of the gradation values is minute, based on the gradation-transmittance characteristic;
   a parameter determining step of determining a white balance parameter for adjusting white balance of the liquid crystal panel so as to correspond to each of the gradation values for each of red, green, and blue colors; and
   a white balance adjustment step of correcting the gradation value of each of the colors based on an input image signal supplied to the liquid crystal display device, by using the white balance parameter determined in the parameter decision step,
   wherein in the parameter determining step, the white balance parameter is determined so that the correction of the gradation value in the white balance adjustment step causes the gradation value within the transmittance approximation range to be a maximum gradation value of each of the colors
   in the characteristic acquisition step, a plurality of gradation-transmittance characteristics corresponding to oblique views from a plurality of directions are acquired, and
   when the transmittance approximation range determined based on each of the gradation-transmittance characteristics is defined as a single direction transmittance approximation range, in the transmittance approximation range defining step, an overlap of the plurality of single direction transmittance approximation ranges determined based on the plurality of gradation-transmittance characteristics is defined as the transmittance approximation range to be referred to in the parameter determining step.

2. A viewing angle characteristic improving method in a liquid crystal display device including a liquid crystal panel having three color filters of red, green, and blue which are different from one another in thickness, the viewing angle characteristic improving method comprising:
   a characteristic acquisition step of acquiring a gradation-transmittance characteristic indicating a relationship between a gradation value and a transmittance regarding each of the three color filters when the liquid crystal panel is viewed from an oblique direction;
   a transmittance approximation range defining step of determining a transmittance approximation range, which is a range of the gradation value in which a difference between a maximum value and a minimum value among three transmittances corresponding to each of the gradation values is minute, based on the gradation-transmittance characteristic;
   a parameter determining step of determining a white balance parameter for adjusting white balance of the liquid crystal panel so as to correspond to each of the gradation values for each of red, green, and blue colors; and
   a white balance adjustment step of correcting the gradation value of each of the colors based on an input image signal supplied to the liquid crystal display device, by using the white balance parameter determined in the parameter decision step,
   wherein in the parameter determining step, the white balance parameter is determined so that the correction of the gradation value in the white balance adjustment step causes the gradation value within the transmittance approximation range to be a maximum gradation value of each of the colors
   the transmittance approximation range defining step includes:
   an initial step of setting a variable indicating the width of the transmittance to a predetermined initial value;
   a candidate range determining step of determining a candidate range, based on the gradation-transmittance characteristic, the candidate range being a range of the gradation value in which the difference between the maximum value and the minimum value among the three transmittances corresponding to each of the gradation values is not more than a value of the variable;
   a determination step of determining whether or not the combination of the gradation values of red, green, and blue that enables the target color temperature to be realized in front view exists within the candidate range;
   a variable value increase step of increasing the value of the variable in accordance with a predetermined rule, when a negative determination is made in the determination step; and
   a range decision step of defining the candidate range as the transmittance approximation range to be referred to in the parameter determining step, when affirmative determination is made in the determination step,
   wherein in first round of the candidate range determining step, the candidate range is determined based on the variable set in the initial step, and
   in second or later round of the candidate range determining step, the candidate range is determined based on the variable whose value is increased in the variable value increase step.

3. The viewing angle characteristic improving method according to claim 1, wherein in the transmittance approximation range defining step, a range of the gradation value in which the difference between the maximum value and the minimum value among the three transmittances corresponding to each of the gradation values is not more than 5% is defined as the transmittance approximation range.

* * * * *